(12) United States Patent
Stopperan et al.

(10) Patent No.: US 6,855,921 B1
(45) Date of Patent: Feb. 15, 2005

(54) SWING SPEED INDICATOR

(75) Inventors: Jahn Stopperan, 17889 Impala Path, Lakeville, MN (US) 55044; Robert Neuman, Cannon Falls, MN (US); David Neuman, Randolph, MN (US)

(73) Assignee: Jahn Stopperan, Lakeville, MN (US)

( * ) Notice: Subject to any disclaimer, the term of this patent is extended or adjusted under 35 U.S.C. 154(b) by 77 days.

(21) Appl. No.: 10/318,642

(22) Filed: Dec. 13, 2002

(51) Int. Cl.⁷ .............................................. G06M 7/00
(52) U.S. Cl. ........................................ 250/221; 356/28
(58) Field of Search .......................... 250/221; 356/28; 473/198, 199

(56) References Cited

U.S. PATENT DOCUMENTS

| | | | | |
|---|---|---|---|---|
| 3,685,909 A | * | 8/1972 | Schwartz | 356/28 |
| 4,574,238 A | * | 3/1986 | Weinlich | 324/178 |
| 5,298,738 A | * | 3/1994 | Gebert et al. | 250/222.1 |
| 5,634,855 A | * | 6/1997 | King | 473/221 |
| 5,833,549 A | | 11/1998 | Zur et al. | 473/199 |

\* cited by examiner

*Primary Examiner*—Thanh X. Luu
(74) *Attorney, Agent, or Firm*—Haugen Law Firm PLLP

(57) ABSTRACT

A portable speed measurement apparatus for determining and displaying speed characteristics of a body passing through a target zone includes radiant energy beam generation units disposed in a first housing, the emitted beams of radiant energy defining a target zone therebetween, and radiant energy sensing units disposed in a second housing, the radiant energy sensing units operably generating an output electrical signal upon perception of pre-determined radiant energy characteristics. The first and second housings are configured and are sufficiently portable so that detection and speed measurement of a body moving through the target zone may be accomplished in any desired plane.

16 Claims, 5 Drawing Sheets

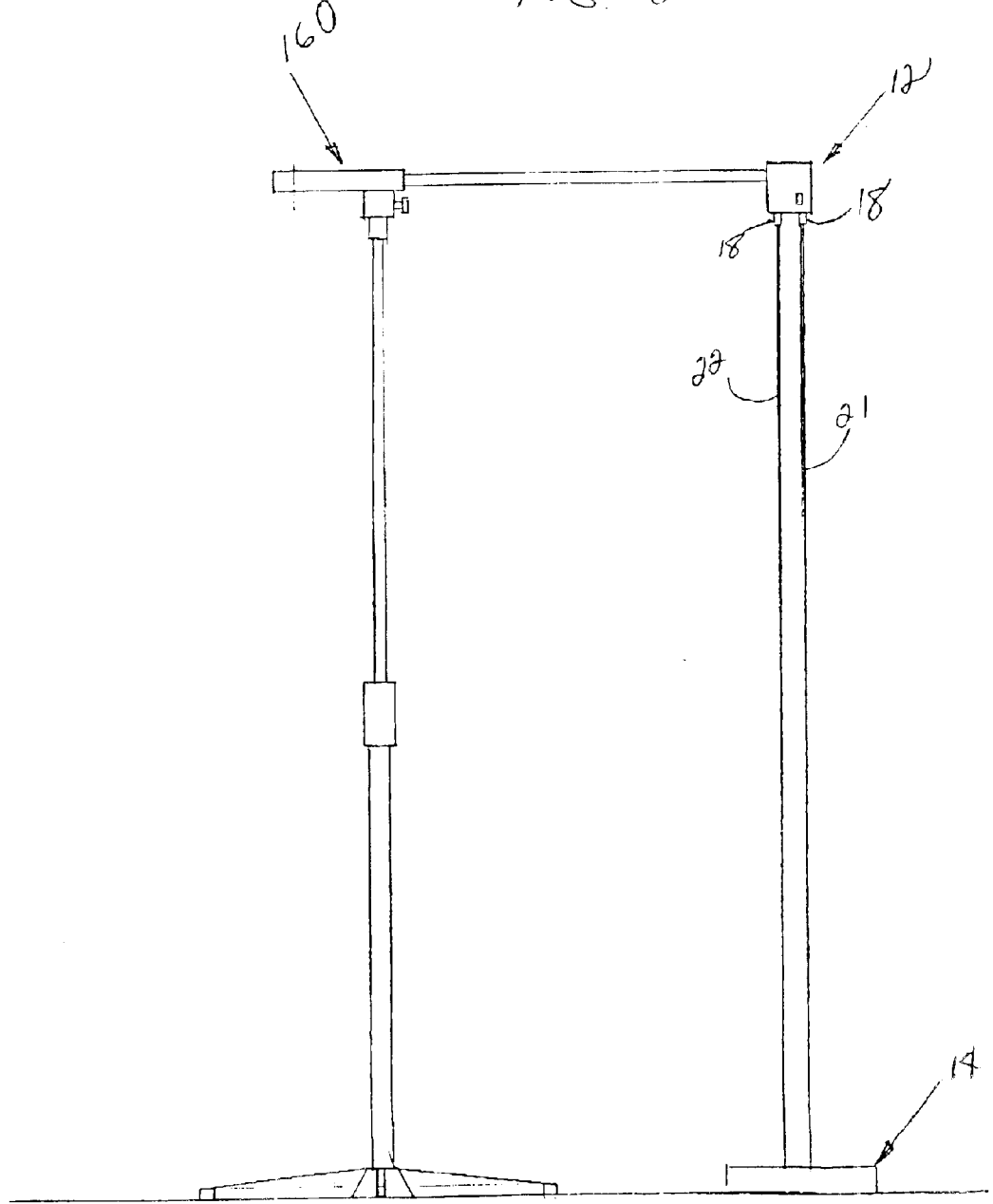

SWING SPEED INDICATOR

FIELD OF THE INVENTION

The present invention relates to speed measurement systems generally, and more particularly to portable systems for efficiently measuring, analyzing and displaying speed characteristics of a body moving through a defined target zone.

BACKGROUND OF THE INVENTION

A variety of systems have been developed to measure the speed and other characteristics of moving bodies traveling through a defined zone. For example, many existing systems are configured to detect and measure characteristics of a golf club and/or a golf ball traveling through a defined zone at or near the impact point between the golf club and the golf ball. Other systems are configured to detect and measure baseball bat movement characteristics through a swing zone thereof.

Several of such detection and measurement systems developed to date utilize radiant energy in some form to obtain nearly instantaneous feedback of information related to the moving body. Typically, such radiant energy is channeled into distinct beams which are directed through the target zone at pre-defined locations. The presence, and consequently the location, of the body in the target zone are detected when the body enters the path of the radiant energy beam. In doing so, the beam is "broken" , and specifically located light sensors operably detect a change in the steady-state radiant energy beam. The sensors can perceive radiant energy reflected by the passing body, or can detect a sudden decrease in radiant energy intensity due to the body interrupting the radiant energy beam. Where multiple beams are utilized in relatively close proximity, progressive movement of the body through the target zone can be detected and analyzed.

Typical such systems utilize two or more distinct light beams placed a known distance apart, such that sequential detection of a body passing through the plurality of beams provides the time required to travel a given distance, which parameters may be used to calculate the velocity of the moving body.

Systems developed to date, however, are limited in their scope of applicability, in that such systems require relatively bulky equipment to fully carry out the detection, analysis, and resulting display processes. Most systems require separate display and/or analysis modules for analyzing and displaying the relevant data to the user. Therefore, it is cumbersome for the user to move and set up the respective system. In particular, most systems are configured for use at a single location due to the multiple separate units that are required to carry out the detection/analysis/display processes.

In addition, existing systems fail to provide an efficient means for simultaneously restricting the access of unwanted ambient light to the photo sensors and assisting a user in aligning the emitted radiant energy beams with the light sensors. These issues are particularly relevant when users desire to use such systems outdoors. Existing systems therefore inhibit outdoor applications.

It is therefore a principle object of the present invention to provide a portable speed measurement system being housed in portable self-contained units capable of detecting, analyzing, and displaying speed characteristics of a body moving through a target zone.

It is a further object of the present invention to provide a portable speed measurement system being sufficiently portable so that detection and speed measurement of a body moving through a target zone may be accomplished in any desired plane.

It is another object of the present invention to provide a portable speed measurement system having ambient light reduction means which simultaneously restrict access of ambient light to the respective photo sensors and assist in aligning the emitted radiant energy beams with such photo sensors.

It is a yet further object of the present invention to provide a portable speed measurement system incorporating ambient light reduction means which simultaneously allow for somewhat non-stationary or non-perpendicular light beams without generating false or incorrect readings by the photo sensors.

SUMMARY OF THE INVENTION

By means of the present invention, an apparatus is provided for efficiently and portably measuring speed characteristics of a body moving through a target zone. The system of the present invention allows the user to position system components in a variety of orientations such that detection and measurement of moving bodies may be accomplished in any desired plane. The measurement apparatus of the present invention incorporates ambient light reduction means in combination with alignment assist means, such that the portable system may be easily and quickly arranged to give reliable and accurate swing speed measurements.

In a particular embodiment of the present invention, the portable speed measurement apparatus includes a radiant energy beam generation means disposed in a first distinct portable housing, with the first portable housing having removable attachment means secured thereto for providing operable and removable attachment of the first housing to various objects. The radiant energy beam generation means is preferably configured to emit a plurality of substantially parallel beams of radiant energy through a bottom end thereof to thereby define a target zone between the parallel radiant energy beams. The apparatus further includes a radiant energy sensing means disposed in a second distinct portable housing, with the second housing having a plurality of apertures in a top portion thereof. The apertures are relatively positioned on the top portion to correspond to the respective emitted radiant energy beams when the second portable housing is placed in proper alignment with the first portable housing. The emitted radiant energy beams passing through the respective apertures are operably perceived by the radiant energy sensing means, with the radiant energy sensing means operably generating an output electrical signal upon perception of pre-determined radiant energy characteristics. The measurement apparatus further includes an electrical signal analysis means operably coupled to the sensing means and disposed within the second portable housing, with the analysis means being programmed to compute the speed characteristics of the body passing through the target zone by comparing the timing of the generated electrical signals to the relative positions of the respective radiant energy beams in the target zone. The speed characteristics are preferably conveyed to the user via display means. Moreover, the first and second portable housings are preferably configured and sufficiently portable such that detection and speed measurement of the body moving through the target zone may be accomplished in any desired plane.

Another aspect of the present invention provides light management means in the second portable housing interposed between the radiant energy sensing means and respective apertures, with the light management means incorporating a light pipe axially positioned adjacent to the radiant energy sensing means. The light pipe includes first and second opposed ends, with the first end being approximately propinquant to the sensing means, and the second end being distally disposed from the sensing means. The light pipe preferably has a relatively larger diameter than the diameter of the respective sensing means, and the distal end of the light pipe is preferably spaced from the respective aperture, thereby forming a light reduction gap between the respective aperture in the second housing and the distal end of the light pipe, such that the emitted radiant energy beams passing through the respective apertures are received in and through the light pipe and correspondingly transmitted to the sensing means.

The pre-determined radiant energy characteristic is preferably relative radiant energy intensity, such that a sudden and substantial decrease in radiant energy intensity perceived by the respective sensing means causes the sensing means to generate a specific output electrical signal.

The analysis means of the present invention preferably computes user reaction time by comparing the time delay from a first electrical signal generated by indicator means to a second electrical signal generated and received from a first radiant energy sensing means.

The radiant energy generated by the radiant energy generation means is preferably laser light having a wavelength between about 600 and 700 nm.

BRIEF DESCRIPTION OF THE DRAWINGS

FIG. 5 is a perspective of a stand means of the present invention.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
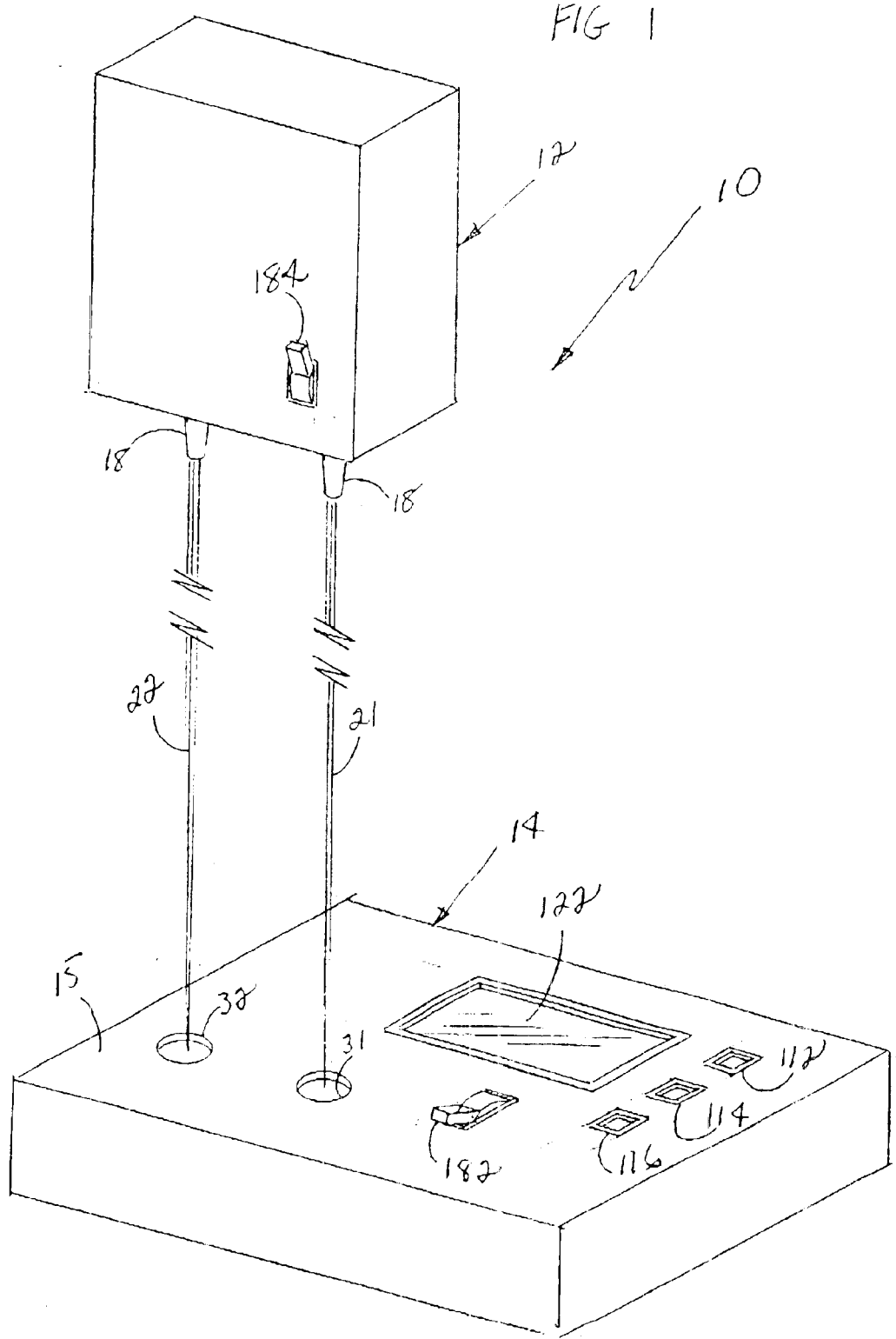
FIG. 1 is a perspective view of the speed measurement apparatus of the present invention.

Referring now by characters of reference to the drawings, and first to FIG. 1, a speed measurement apparatus 10 of the present invention is shown. Apparatus 10 preferably includes a first distinct housing 12 and a second distinct housing 14. Though the particular shapes of respective housing 12, 14 are not critical to the present invention, it is an important aspect that both first and second portable housings 12, 14 be sufficiently compact and lightweight so as to be easily maneuverable by a single user. In preferred embodiments, first housing 12 is about 9 cu. in. (4.5"×0.8"× 2.5") in size and weighs about 5 oz. Similarly, second portable housing 14 is about 70 cu. in. (7"×5"×2") in size and weighs about 13 oz. Such size and weight characteristics of first and second portable housings 12, 14 are by no means limiting, but are provided to demonstrate the portability characteristic of the present invention.

As shown in FIG. 1, first portable housing 12 includes radiant energy beam generation means 18 disposed on a bottom end 13 thereof. Radiant energy beam generation means 18 are preferably laser generating units, though a variety of radiant energy wavelengths and formats may be used. For example, light emitting diodes (LEDs) may be used in place of the laser beam generators 18. In preferred embodiments, radiant energy beam generation means 18 emits a laser beam having a wavelength between about 600 and 700 nm. Preferably, first portable housing 12 includes a plurality of radiant energy beam generation means 18 disposed in a specific defined relationship to one another and configured to emit substantially parallel radiant energy beams.

Radiant energy beam generation means 18 are preferably relatively positioned a known distance apart such that the substantially parallel radiant energy beams emitted therefrom are correspondingly a known distance from one another. Such radiant energy beams are illustrated in FIG. 1 and designated by reference numerals 21, 22. The known distance between respective radiant energy beams 21, 22 is utilized in the analysis of the speed of a body passing through a target zone defined by the radiant energy beam 22 and the region therebetween. Such moving body speed is calculated by dividing the distance between respective radiant energy beams 21, 22 passed through by the moving body by the elapsed time between sequential detection of the moving body at the respective radiant energy beams 21, 22.

In the embodiment illustrated in FIG. 1, first portable housing 12 includes two spaced apart radiant energy beam generation means 18. However, it is contemplated by the present invention to incorporate more than two radiant energy beam generation means 18 in a variety of configurations for various applications. For example, speed measurement apparatus 10 may be utilized in applications where the direction of motion of the moving body through the target zone is not orthogonal to, or aligned in a plane containing beams 21, 22. In such an application (e.g. martial arts) it is preferred to utilize particular multiple radiant energy beam configurations whereby the distance traveled by the moving body through the target zone is not misjudged due to the oblique angle of travel of the moving body through the target zone. Moreover, multiple radiant energy beams may be utilized to sense moving bodies traveling through the target zone in various paths.

When properly aligned with first portable housing 12, second portable housing 14 is preferably configured to receive respective radiant energy beams 21, 22 through respective apertures 31, 32 disposed in a top surface 15 thereof. Such radiant energy beams 21, 22 are preferably perceived within second portable housing 14 by respective photo sensors 42, which photo sensors 42 are preferably operably coupled to electrical circuitry on substrate 58. Photo sensors 42 of the present invention are preferably particularly selected for sensitivity to the respective emitted radiant energy. Most preferably, photo sensors 42 are sensitive to radiant energy having a wavelength of between about 600 and 700 nm. In preferred embodiments of the present invention, photo sensors 42 are configured to generate a voltage corresponding to the radiant energy intensity received thereby. In such a manner, a drop in radiant energy intensity perceived by photo sensors 42 will correspondingly result in a decreased voltage output. Such changes in voltage output are preferably conventionally transformed into a corresponding electrical signal by the circuitry disposed on substrate 58.

The present invention contemplates a variety of radiant energy sensing means, and describes the use of radiant energy intensity photo sensors only as a preferred embodiment herein. Other types of photo sensors, including wavelength dependent sensors, are also contemplated by the present invention. A particularly preferred photo sensor for use in the present invention is manufactured by Telefunken, Inc. of Hanover, Germany.

Figure 2:
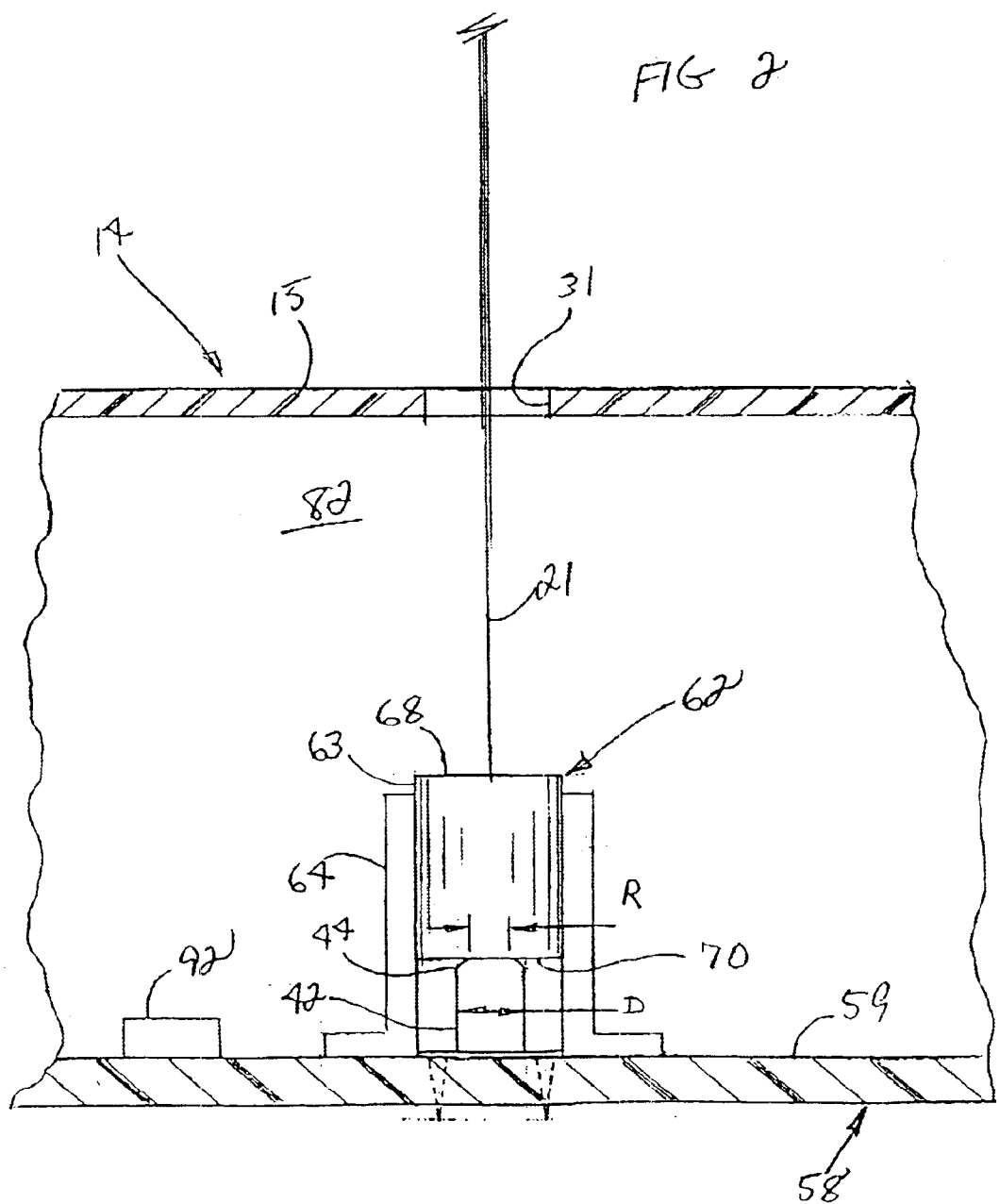
FIG. 2 is an interior cross-sectional view of a portion of the speed measurement apparatus of the present invention.
Figure 3:
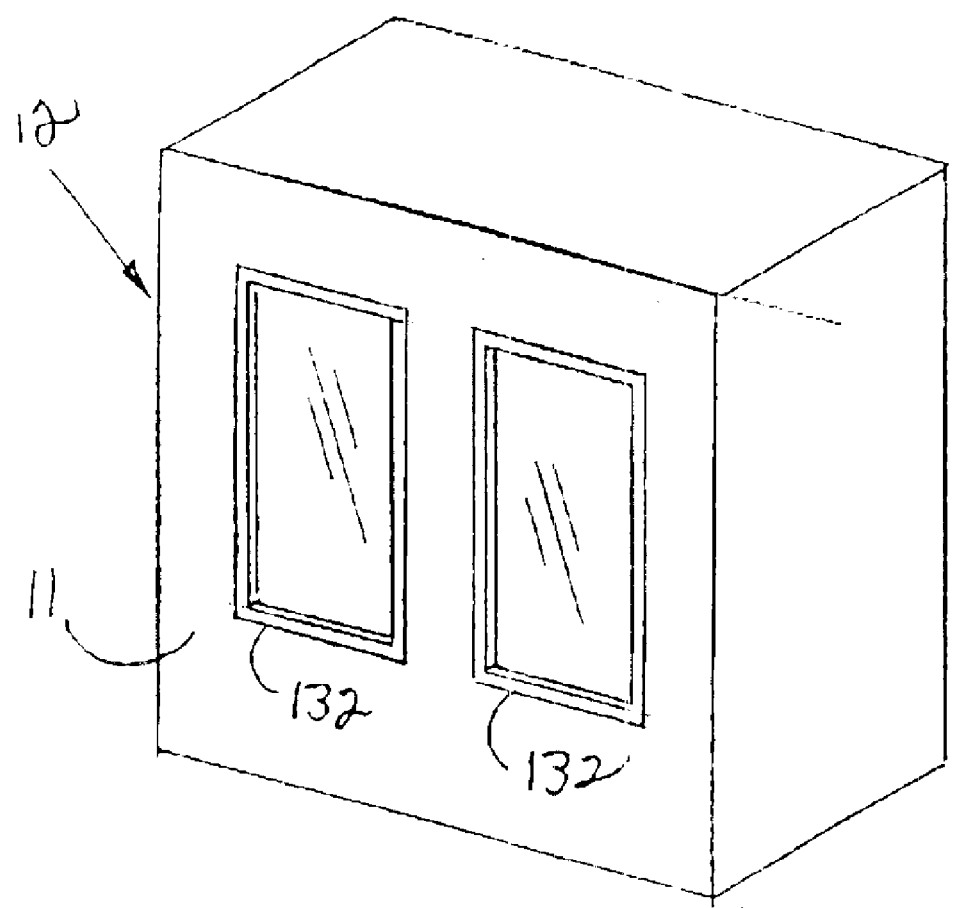
FIG. 3 is a rear view of a portion of the speed measurement apparatus of the present invention.
Figure 4:
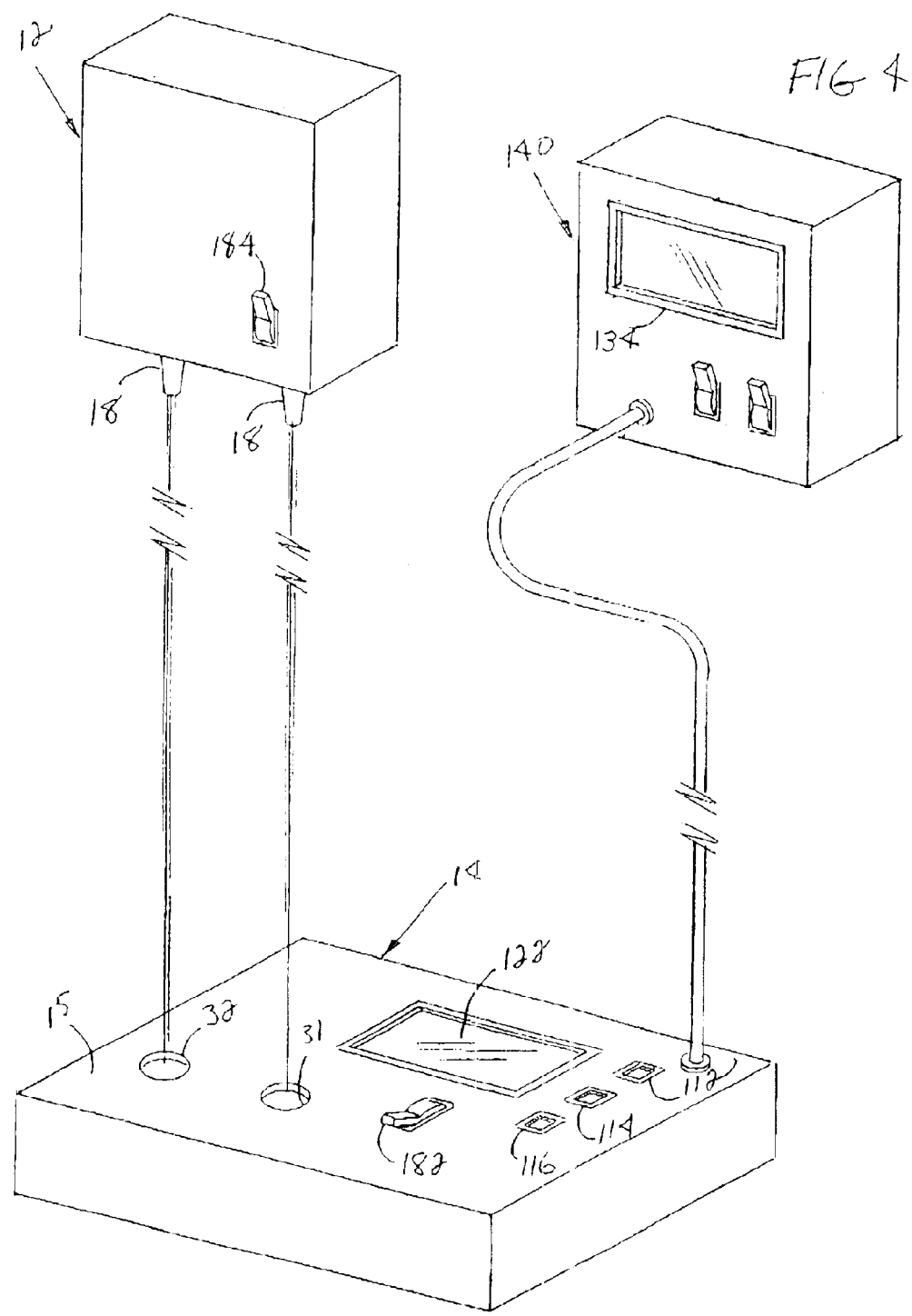
FIG. 4 is a perspective view of a speed measurement apparatus of the present invention.

A preferred embodiment of the present invention is illustrated in FIG. 2, wherein a light pipe 62 is secured axially adjacent to photo sensor 42 via securing means 64, which securing means 64 may comprise a substantially concentric sleeve secured to an outer surface 63 of light pipe 62 and an upper surface 59 of substrate 58. Other configurations for securing means 64 are contemplated by the present invention, so long as light pipe 62 is maintained in an axially adjacent position relative to photo sensor 42. Securing means 64 is preferably fabricated from a relatively lightweight and strong material such as a polymeric material, but may also be fabricated from a metallic material if sufficiently electrically insulated from the circuitry disposed on substrate 58. Light pipe 62 is preferably fabricated from an acrylic material, but other materials having fiber optic properties are contemplated by the present invention.

In a particular aspect of the present invention, light pipe 62 is a substantially solid body having a distal end 68 and a proximal end 70 thereof. The material of light pipe 62 allows radiant energy beam 21 to pass therethrough to reach photo sensor 42.

Preferably, the diameter of light pipe 62 is greater than the diameter of "D" of photo sensor body 42, and more particularly greater than the effective receptive diameter "R" of photo sensor 42. To generate an electrical response, photo sensor 42 typically requires radiant energy to enter the photo sensor body through a defined portion of photo sensor crown 44. Such an effective area of photo sensor crown 44 is defined by R as illustrated in FIG. 2. An example of this relationship in a specific application provides a photo sensor body diameter dimension D of 0.150 inches, and an effective area R of 0.085 inches.

The photo sensor effective area is typically limited to the area defined by R because the receptor area of photo sensor 42 is substantially centrally disposed at or near a base portion thereof. As a result, incoming radiant energy must typically pass through a central portion of photo sensor crown 44 to thereby be received and detected by the sensor portion of photo sensor 42. The apparatus of the present invention, however, substantially increases the photo sensor 42 effective area by "diffusing" incoming radiant energy beams across the diameter of light pipe 62, and directing them into photo sensor 42. In such a manner, radiant energy beams 21, 22 which are not centrally disposed with respective to photo sensor 42 may still be directed into, and thereby detected by photo sensor 42.

Preferably, light pipe 62 is a material effective in transporting substantially all radiant energy imparted thereon. Light pipe 62 preferably acts as a fiber optic filament, wherein non-axial radiant energy beams are internally reflected at an outer surface thereof, such that the beams are re-directed along the path defined by light pipe 62. Through such a characteristic, internal reflection of radiant energy beams 21, 22 is accomplished, thereby diffusing or otherwise capturing and directing radiant energy beams out through proximal end 70 of light pipe 62. Such diffusion of the radiant energy beams entering light pipe 62 allows redirection of such beams as a cross-sectional "glow" into photo sensor 42 for detection thereof. The effective detection area of photo sensor 42 is correspondingly increased to substantially the diameter of light pipe 62.

To fully accomplish the expansion of the effective detection area of photo sensor 42, light pipe 62 is preferably positioned substantially adjacent to photo sensor crown 44. Most preferably, proximal end 70 of light pipe 62 is disposed immediately adjacent to photo sensor crown 44. The preferred configuration allows internally reflected radiant energy beams 21 within light pipe 62 to be directed into photo sensor 42 at a non-perpendicular angle.

The light pipe configuration of the present invention assists a user in aligning radiant energy beams 21, 22 with respective photo sensor 42 through respective apertures 31, 32 by redirecting somewhat misdirected beams into the photo sensor 42. For example, if radiant energy beam 21 enters second portable housing 14 through aperture 31 at an angle with respect to the axis defined by light pipe 62, the official properties of light pipe 62 will redirect or diffuse the misaligned radiant energy beam 21 into photo sensor 42. Therefore, the light pipe assembly of the present invention is preferably adapted to transmit both aligned and somewhat misaligned radiant energy beams to photo sensor 42 to thereby generate appropriate electrical signals upon changes in radiant energy intensity imparted upon photo sensor 42. Such a characteristic is useful in situations where precise parallel alignment between first and second portable housings 12, 14 is not readily feasible, and in applications where one or more of first and second portable housings 12, 14 are not completely motionless. In such a manner, "wiggling", or slight movement of first portable housing 12 due to wind or other forces will not result in a misreading by photo sensor 42, in that somewhat misaligned radiant energy beams 21, 22 may still be captured and redirected into respective photo sensor 42.

In preferred embodiments of the present invention, the diameter of light pipe 62 is equal to or greater than the diameter of respective aperture 31. Such a relative configuration allows any and all radiant energy passing perpendicularly through aperture 31 to be received and transmitted through light pipe 62 to photo sensor 42. In addition, the diameter of light pipe 62 may be slightly larger than the diameter of respective aperture 31 so as to capture radiant energy beams passing through aperture 31 at an angle slightly displaced from perpendicular. Such a configuration further provides an alignment assist means for the user, whereby the position of first portable housing 12 relative to second portable housing 14 need not be absolutely precise to obtain the desired detection and electrical output from respective photo sensor 42. In preferred embodiments of the present invention, the diameter of light pipe 62 is between about 0.100 and about 0.500 inches. In a particular embodiment of the present invention, the diameter of light pipe 62 is about 0.250 inches. In accordance with the above, the respective diameters of apertures 31, 32 are preferably between about 0.005 and about 0.400 inches, and in a particular embodiment have a diameter of about 0.240 inches. The dimensions recited above are provided for exemplary purposes only, and are by no means limiting in the scope. As such, particular applications of the present invention may require dimensions outside the preferred ranges listed above. Additionally, light pipe assemblies are contemplated as being present at each photo sensor 42 in apparatus 10.

In another aspect of the present invention illustrated in FIG. 2, a means for reducing the incursion of ambient light to photo sensor 42 is obtained by providing a light reduction gap between distal end 68 of light pipe 62 and the respective aperture 31. The spaced relationship therebetween forming light reduction gap 82 limits the amount of ambient light reaching photo sensor 42, such that error in electrical output from respective photo sensor 42 is minimized. Light reduction gap 82 results in substantially non-perpendicular light passing through respective aperture 31 to bypass light pipe 62 and therefore not be perceived by respective photo sensor 42. As such, only perpendicular and slightly non-perpendicular radiant energy will be captured and transmitted to the respective photo sensor 42 by light pipe 62, while substantially non-perpendicular radiant energy is not so captured and transmitted. As a result, the configuration of the present invention substantially reduces the amount of ambient light perceived by the respective photo sensor 42.

In preferred embodiments of the present invention, light reduction gap 82 between light pipe 62 and the respective apertures 31, 32 is between about 0.1 and about five times the diameter of light pipe 62. More particularly, light reduction gap 82, as defined between distal end 68 of light pipe 62 and respective aperture 31 is between about 0.010 inches and about 2.500 inches. More preferably, light reduction gap 82 is between about 0.200 and about 1.000 inch in dimension. In a particular application of the present invention, light reduction gap 82 is about 0.400 inches.

In some embodiments of the present invention, a radiant energy filter may be disposed between photo sensor 42 and the respective aperture 31. Such a filter is preferably located at either distal end 68 of light pipe 62 or at the respective apertures 31, 32 whereby only radiant energy having certain characteristics may pass therethrough. Preferably, such a filter is restrictive to particular radiant energy wavelengths in that only specific wavelengths of radiant energy is allowed to pass therethrough. Most preferably, such a filter only allows radiant energy having a wavelength between about 600 and 700 nm to pass therethrough. In such a manner, only specific radiant energy, namely the radiant energy emitted by radiant energy beam generation means 18, is allowed to pass into the light pipe 62 and, consequently, the respective photo sensor 42. An example of such a wavelength-restricting filter is manufactured by Edmond Scientific of Fairfax, Va. Other filters, such as those which block non-perpendicular light, may also be utilized in the present invention, and are manufactured by Vikuiti and marketed by 3M Corp. of St. Paul, Minn.

Another important aspect of the present invention includes an electrical signal analysis means 92 that is operably and electrically coupled to the photo sensors 42 for receiving and analyzing the electrical signals generated thereby. As illustrated in FIG. 2, electrical signal analysis means 92 is disposed within second portable housing 14, and generally comprises conventional means for receiving and interpreting electrical signals from the respective photo sensors 42. In particular, such electrical signal analysis means 92 preferably includes electrical circuitry and computational components whereby electrical input is interpreted and analyzed to provide the user with meaningful data. Preferably, electrical signal analysis means 92 records the time delay among the electrical signals received from respective photo sensors 42. Such electrical signals are preferably identifiable by electrical signal analysis means 92, such that a time delay between specific photo sensors 92 indicates a direction of travel of a moving body through the target zone. Such Information is then computed by electrical signal analysis means 92 into a speed by dividing the known distance between the radiant energy beams by the time delay in receiving electrical signals from such respective photo sensors 42. In other words, the signal analysis means 92 compares the timing of the respective generated electrical signals to the relative positions of the respective radiant energy beams of the target zone.

A variety of speed characteristics of the moving body may be received and analyzed by electrical signal analysis means 92. A particular example of an alternative speed characteristic of the moving body is the computation of a user's reaction time to a given signal. As illustrated in FIG. 1, second portable housing 14 of speed measurement apparatus 10 preferably includes a plurality of selectively activatable illumination means 110, which illumination means indicate a desired user action. For example, a first indicator 112 may indicate whether the unit is on, or may indicate a particular mode in which the unit is being operated. A second indicator 114 may convey a "ready" signal, such that, the user is instructed to be poised for a given action. A third indicator 116 may be utilized to indicate to the user to begin an action, such as to swing through the target zone. Indicators 112, 114, 116 are preferably illuminating lamps, but may instead by other visual or audio indicating means. In the application of assessing the user's reaction time to a given input, indicator 116 generates a first electrical signal that is transmitted to signal analysis means 92 upon illumination or otherwise indication from indicator 116. Such a first electrical signal received by signal analysis means 92 initiates a timer which records the time delay between the signal from indicator 116 and a second electrical signal sent from a particular photo sensor 42, which photo sensor 42 represents the first radiant energy beam interruption by the moving body through the target zone. This time delay is recorded as the user's reaction time to the signal emanated from indicator 116. For example, a batter prepares to swing through the target zone when indicator 114 is illuminated, and initiates the swing of the bat through the target zone when indicator light 116 is illuminated. To keep the user "off guard", the time delay between indication by indicator 114 and indication by indicator 116 is randomized by signal analysis means 92.

Though the system of the present invention is described above as containing three indicators, it is contemplated that any number of indicators may be utilized to communicate various information to the user. Indicators 112, 114, 116 may alternatively be displayed within display means 122, which display means is disposed in upper surface 13 of second portable housing 14. Such display means 122 comprises conventional display architecture such as LCD or other electronic display mechanisms. Preferably, analysis means 92 is operably and electrically coupled to display means 122, such that computed information such as moving body speed and user reaction time may be transmitted and displayed in convenient units on display means 122. Therefore, information relevant to speed characteristics of a body moving into and through the target zone may be readily perceived by the user in viewing display means 122.

The apparatus of the present invention is preferably configured and sufficiently portable to relatively position first and second portable housings 12, 14 such that the target zone defined by respective radiant energy beams 21, 22 extends in any desired plane. As a consequence, measurement of speed characteristics of a moving body may be accomplished in any desired plane. For example, the configuration as illustrated in FIG. 1 is primarily adapted for measurement of substantially horizontal movement of a body through radiant energy beams 21, 22. Baseball bats, tennis rackets, and the like are examples of bodies that are moved in a substantially horizontal direction. However, the configuration illustrated in FIG. 1 is most adaptable to movement of bodies above the ground. Where applications are desired such as golf clubs, hockey sticks, rolling objects, and the like, where horizontal movement adjacent the ground is preferred, first and second portable housings 12, 14 may be arranged such that radiant energy beams 21, 22 extend in a generally horizontal direction. Moreover, the plane defined by substantially parallel emitted beams 21, 22 may be placed in any desired orientation, such that more oblique-angled swing motions, such as in martial arts maneuvers, may be readily detected and analyzed by the system of the present invention.

To accommodate such portability, a removable securement means 132 is provided on a rear surface 11 of first portable housing 12. Removable securement means 132 may be, for example, one or more magnets, hook and loop type fasteners, low tack adhesive, or any other securement means which allows first portable housing 12 to be removably secured to various bodies. In such a manner, first portable housing 12 may be easily positioned and secured against a variety of structures convenient for use in the particular application. Such removable securement means 132 preferably acts to suspend first portable housing 12 in a position somewhat above a ground surface. However, it is contemplated by the present invention that first portable housing 12 may be utilized when placed upon a ground surface, so long as the radiant energy beam generation means emit radiant energy beams in a direction towards respective apertures 31, 32 in second portable housing 14.

First and second portable housing 12, 14 are preferably self-contained in that each housing is self-powered and no external power cords or other attachments are necessary.

In some embodiments of the present invention, a distinct third portable housing is provided for more conveniently positioning of display means 134 in an orientation visible to the user. Display means 134 in third portable housing 140 is preferably operably and electrically coupled to analysis means 92 in second portable housing 14, whereby information generated by analysis means 92 may be displayed at third portable housing 140.

Another aspect of the present invention includes the provision of a complimentary-configured stand means 160 which is configured to securely retain at least first portable housing 12 in a desired orientation relative to second portable housing 14. Such stand means 160 is preferred in applications where the mounting of one or more of first and second portable housings 12, 14 may not be sufficiently stable to maintain a consistent transmission of radiant energy beams 21, 22 to the respective photo sensors 42. Stand means 160 may also be preferably configured to secure both first and second portable housings 12, 14 in a desired relative orientation.

In a particular application of the present invention, a user preferably energizes the system 10 by moving power switches 182, 184 to their respective "on" positions. Thereafter, the user is able to select among a variety of calculation modes, for example, speed only, reaction time only, or speed and reaction time. Other modes of operation are also contemplated by the present invention. In the speed mode, the user may swing through the target zone upon illumination of a ready signal such as at indicator 114. Sequential interruption of respective radiant energy beams 21, 22 results in the calculation of the swing speed, as described above. In the reaction time mode, a sequential illumination, for example, of indicators 112, 114, 116 indicate to the user when the system is ready, when the user should prepare to swing, and when to swing, respectively. Reaction time, as described above, is calculated as the time delay between illumination of indicator 116 and interruption of one of radiant energy beams 21, 22.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A portable speed measurement apparatus for determining and displaying speed characteristics of a body passing through a target zone, said measurement apparatus comprising:

a radiant energy light beam generation means disposed in a first distinct housing, said generation means being configured to emit a plurality of substantially parallel beams of radiant energy through a bottom end thereof to thereby define said target zone between said parallel radiant energy beams;

a radiant energy sensing means disposed in a second distinct housing, said second housing having a plurality of apertures in a top portion thereof, such apertures being relatively positioned on said top portion to correspond to respective emitted radiant energy beams when said second housing is placed in proper alignment with said first housing, said second housing further including light management means interposed between said radiant energy sensing means and respective said apertures, said light management means incorporating a fiber optic light pipe axially positioned adjacent to said radiant energy sensing means, said fiber optic light pipe having first and second opposed ends, said first end being approximately propinquant to said radiant energy sensing means, and said second end being distally disposed from said radiant energy sensing means, such that said fiber optic light pipe operably propagates radiant energy from said second ends to said first end, and additionally to said radiant energy sensing means, said fiber optic Light pipe having a relatively larger diameter than the diameter of the respective radiant energy sensing means, and said distal end of said fiber optic light pipe being spaced from the respective aperture, thereby forming a light reduction gap between the respective aperture in said second housing and said second distal end of said fiber optic light pipe, such that the emitted radiant energy beams passing through the respective apertures are received in and through said fiber optic light pipe and correspondingly transmitted to said radiant energy sensing means, said radiant energy sensing means operably generating output electrical signals upon perception of predetermined radiant energy characteristics; and electrical signal analysis means operably coupled to said radiant energy sensing means and disposed within said second housing, said analysis means being programmed to compute such speed characteristics of the body passing through said target zone by comparing the timing of the generated electrical signals to the relative positions of respective radiant energy beams in said target zone, such speed characteristics being conveyed to a user via display means.

2. A portable speed measurement apparatus as in claim 1 wherein said speed characteristics include user reaction time.

3. A portable speed measurement apparatus as in claim 1 wherein said radiant energy generation means is configured to emit two parallel beams.

4. A portable speed measurement apparatus as in claim 1 wherein said pre-determined radiant energy characteristic is relative radiant energy intensity, such that a sudden and substantial decrease in radiant energy intensity perceived by the respective radiant energy sensing means causes said radiant energy sensing means to generate a specific output electrical signal.

5. A portable speed measurement apparatus as in claim 1 wherein said pre-determined radiant energy characteristic is a specific wavelength range.

6. A portable speed measurement apparatus as in claim 5 wherein said wavelength range is between about 600 and 700 nm.

7. A portable speed measurement apparatus as in claim 1 wherein the light reduction gap is between about 0.1 and about 5 times the diameter of said fiber optic light pipe.

8. A portable speed measurement apparatus as in claim 1 wherein the diameter of said fiber optic light pipe is relatively larger than the respective aperture diameter.

9. A portable speed measurement apparatus as in claim 1 wherein said display means includes selectively activatable indicator means for indicating to the user when to swing through said target zone.

10. A portable speed measurement apparatus as in claim 9 wherein selected said indicator means are configured to generate and transmit an electrical signal to said analysis means upon activation of said selected indicator means.

11. A portable speed measurement apparatus as in claim 9 wherein activation of said indicator means is randomized.

12. A portable speed measurement apparatus as in claim 10 wherein said analysis means computes user reaction time by comparing a time delay from a first electrical signal generated by said indicator means to a second electrical signal received from a first one of said radiant energy sensing means.

13. A portable speed measurement apparatus as in claim 1 wherein said radiant energy is laser light.

14. A portable speed measurement apparatus as in claim 13 wherein said laser light wavelength is between about 600 and 700 nm.

15. A portable speed measurement apparatus as in claim 1, including one or more radiant energy filters interposed between the apertures and the distal ends of respective said fiber optic light pipes to thereby limit radiant energy passing into said fiber optic light pipes and to said radiant energy sensing means to wavelengths between about 600 and 700 nm.

16. A portable speed measurement apparatus as in claim 1 wherein said fiber optic light pipe is a solid cylinder of acrylic material.

* * * * *